United States Patent
Bender

(10) Patent No.: US 8,010,995 B2
(45) Date of Patent: Aug. 30, 2011

(54) METHODS, SYSTEMS, AND COMPUTER PROGRAM PRODUCTS FOR IMPLEMENTING INTER-PROCESS INTEGRITY SERIALIZATION

(75) Inventor: Ernest S. Bender, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 11/530,087

(22) Filed: Sep. 8, 2006

(65) Prior Publication Data

US 2008/0066177 A1    Mar. 13, 2008

(51) Int. Cl.
*G06F 21/00* (2006.01)

(52) U.S. Cl. .................. 726/2; 726/17; 726/21; 726/22

(58) Field of Classification Search .................... 718/100
See application file for complete search history.

(56) References Cited

U.S. PATENT DOCUMENTS

| | | | |
|---|---|---|---|
| 5,745,676 A | 4/1998 | Hobson et al. | |
| 5,974,550 A | 10/1999 | Maliszewski | |
| 6,289,462 B1 * | 9/2001 | McNabb et al. | ................ 726/21 |
| 2002/0048369 A1 * | 4/2002 | Ginter et al. | .................. 380/277 |
| 2003/0212540 A1 * | 11/2003 | Meredith et al. | .................. 704/4 |
| 2004/0078591 A1 * | 4/2004 | Teixeira et al. | ............... 713/201 |
| 2005/0182966 A1 * | 8/2005 | Pham et al. | .................... 713/201 |
| 2005/0188218 A1 * | 8/2005 | Walmsley et al. | ............ 713/200 |

FOREIGN PATENT DOCUMENTS

EP        1349033 A1    10/2003

* cited by examiner

*Primary Examiner* — Minh Dinh
*Assistant Examiner* — David Le
(74) *Attorney, Agent, or Firm* — Cantor Colburn LLP; William A. Kinnaman, Jr.

(57) ABSTRACT

A method, system, and computer program product for implementing inter-process integrity serialization services is provided. The method includes enabling process states including a must-stay-controlled (MSC) state and an extended must-stay-controlled (EMSC) state for an invoking process when it is determined that only programs designated as controlled, if any, have been loaded for the invoking process. The invoking process requests loading of a target program into temporary storage for performing a security service. Based upon a control indicator of the target program, the MSC state, and the EMSC state, the method includes controlling one or more activities within the temporary storage. The activities include loading the target program into the temporary storage, executing a main program in the temporary storage, and resetting the MSC state and the EMSC state across execution of the main program during the lifetime of the invoking process.

20 Claims, 3 Drawing Sheets

US 8,010,995 B2

METHODS, SYSTEMS, AND COMPUTER PROGRAM PRODUCTS FOR IMPLEMENTING INTER-PROCESS INTEGRITY SERIALIZATION

BACKGROUND OF THE INVENTION

The present disclosure relates generally to address space communications and, in particular, to methods, systems, and computer program products for implementing inter-process integrity serialization for establishing a level of trust between processes.

Applications that span multiple processes are sometimes required to exchange sensitive data and/or provide a set of authorized commands that can be requested of one another. A problem arises when one of the processes in an application has errantly loaded a program from a non-protected library. Once one process in the application loses integrity, the entire application may no longer be secure thereby placing sensitive data at risk. An example of this is a daemon process (e.g., a parent process) of a login application that creates a child process that will act on behalf of a client. The child process executes authorized client code that will then start an exchange of information with its parent (e.g., the daemon process). In the course of events, the child process inadvertently loads an executable program from a non-controlled library and becomes infected. The daemon parent process continues to accept requests from the infected child process thereby leading to a possible breach of security.

What is needed, therefore, is a way to establish trust between processes that endures for the life of the processes when one or more of these processes require the exchange of sensitive data.

BRIEF SUMMARY OF THE INVENTION

Embodiments of the invention include method for implementing inter-process integrity serialization services. The method includes enabling process states including a must-stay-controlled (MSC) state and an extended must-stay-controlled (EMSC) state for an invoking process when it is determined that only programs designated as controlled, if any, have been loaded for the invoking process. The invoking process requests loading of a target program into temporary storage for performing a security service. Based upon a control indicator of the target program, the MSC state, and the EMSC state, the method includes controlling one or more activities within the temporary storage. The activities include loading the target program into the temporary storage, executing a main program in the temporary storage, and resetting the MSC state and the EMSC state across execution of the main program during the lifetime of the invoking process.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Inter-process integrity serialization services are provided in accordance with exemplary embodiments. The inter-process integrity serialization services provide a method in which a process may explicitly set a state within an address space (temporary storage) that prevents loads from any unauthorized library. The state is referred to herein as an extended must-stay-controlled (MSC) state. Once the state is set, the process may then create a child process, whereby the extended MSC (EMSC) state is propagated to that child. The EMSC is configured such that it cannot be disabled by any programmatic means, thereby ensuring that for the life of the two processes (e.g., the parent and child), no unauthorized loads may occur. An interface is also provided by the inter-process integrity serialization services to allow the child process to query this new state and, if enabled, the child process is ensured that its parent process is also secure.

Figure 1:
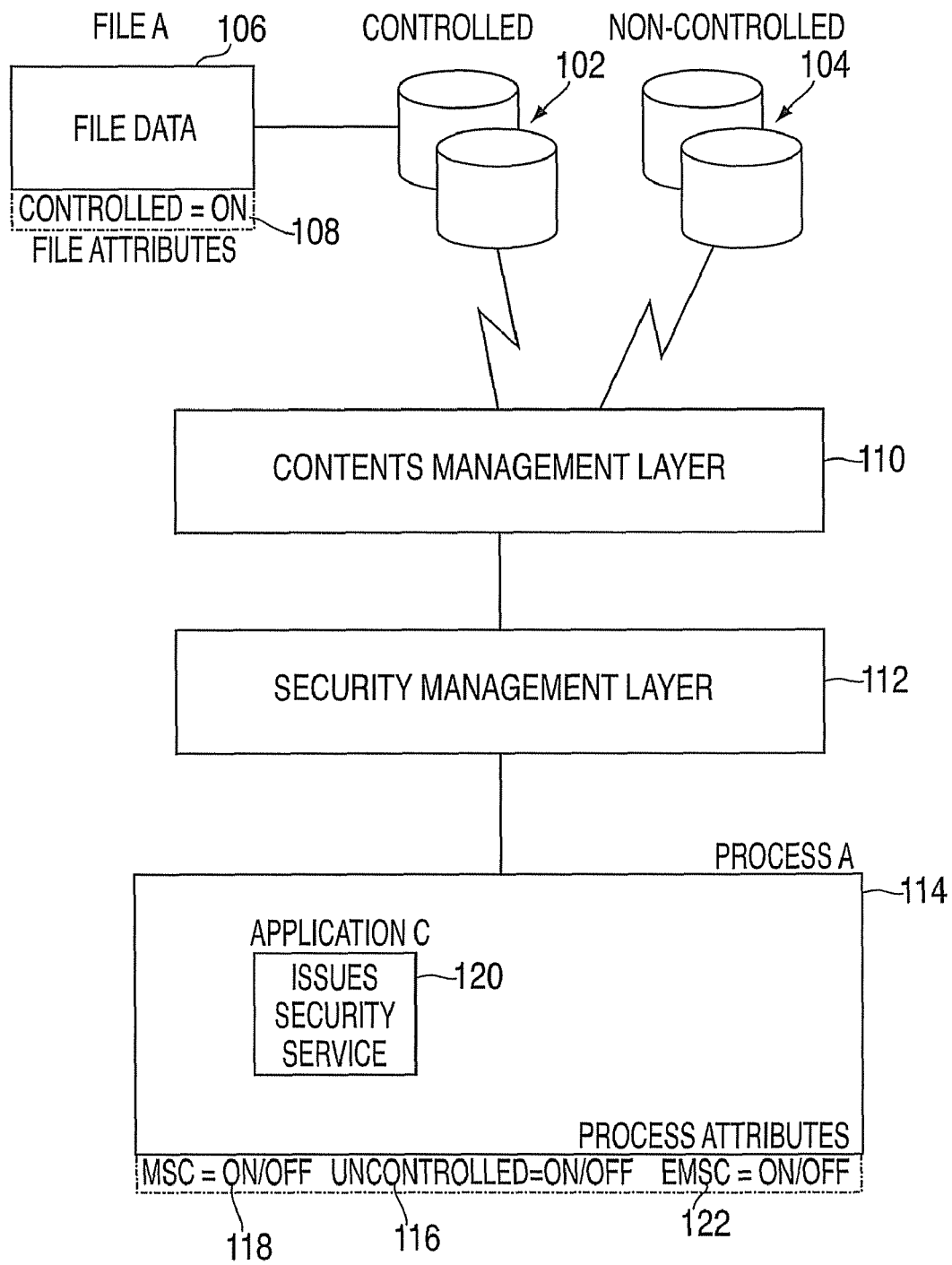
FIG. 1 is a block diagram of a portion of a system upon which inter-process integrity serialization services may be implemented in accordance with exemplary embodiments.

Turning now to FIG. 1 a portion of a system upon which the inter-process integrity serialization services may be implemented in accordance with exemplary embodiments will now be described. The system of FIG. 1 may be part of a computer processing system (e.g., mainframe computer or other high-powered multiprocessor device) and includes databases 102, 104, a contents management layer 110, a security management layer 112, and one or more processes (e.g., process A 114) in communication with one another. The inter-process integrity serialization services may be implemented as an independent software tool via one or more applications executing on the computer processing system. Alternatively, the inter-process integrity serialization services may be implemented via the contents management layer 110, the security management layer 112, or a combination thereof, via program code adapted for use within these system elements.

The processes are implemented within a temporary storage location that is addressable by the contents management layer 110 and security management layer 112. The system of FIG. 1 allows installations the ability to mark volumes, data sets, or individual files as 'controlled' via external attributes that may be set by installation-defined administrative users.

The inter-process integrity serialization services implemented via the system of FIG. 1 prevent a process (e.g., process A 114) when in a MSC state from loading non-controlled programs or files. A controlled file is defined as a file that has been verified by the system programmer as meeting all security/integrity guidelines of the computer network where the file is to be executed (e.g. free of virus/worms). Whereas a non-controlled file may be a newly developed program that is not available for general system usage (e.g., a new tool written for personal use). In essence, controlled programs may be considered as trusted, whereas uncontrolled programs are not. A user of the system with administrative authority may be tasked with determining which files or programs (e.g., file 106) within a data repository (e.g., databases 102 and 104) of the system are controlled. Controlled files (e.g., file A 106) are flagged with an external attribute setting 108 (e.g., "Controlled=On"). This external attribute setting is referred to herein as a 'control indicator'.

The contents management layer 110 of the system is responsible for ensuring that only 'controlled' programs are loaded into the requesting process (e.g., process A 114) when that process has been flagged as MSC (e.g., MSC-enabled). A process may be defined as one or more operations that utilize some resource for the purpose of producing a desired outcome. The contents management layer 110 may be implemented via a middleware application for managing the capture, storage, retrieval, etc., of content. Content may include applications, files, documents, etc.

As shown in the system of FIG. 1, process 114 includes process attributes that specify a current state of the process: MSC attribute 118, uncontrolled attribute 116, and EMSC attribute 122. Contents management layer 110 is also responsible for marking the process 'uncontrolled' (via attribute 116) as a result of a successful load of a 'non-controlled' program. In conventional MSC-enabled systems, the 'uncontrolled' state of a process can only be reset by the execution of a main program (e.g., application C 120) that is from a controlled or uncontrolled library (e.g., databases 102/104). A main program may be defined as one in which all application storage of the invoking process (e.g., process A 114) is cleared before control is given to a new executable. Unlike the conventional MSC-enabled systems, the inter-process integrity serialization services prevent reset of the 'uncontrolled' state for the life of the process(es) as described herein.

The contents management layer 110 checks with security management layer 112 of the system to determine if files (e.g., file A 106) can be loaded into a process (e.g., process A 114). The security management layer 112 may be implemented using a set of functions for safeguarding the system's data and applications. The security management layer 112 is responsible for failing any services, that are deemed as 'security' related, that are attempted by an application (e.g., application C 120) in an 'uncontrolled' process (e.g., when uncontrolled attribute 116=ON). Security management layer 112 is also responsible for marking a process as MSC (via MSC attribute 118) upon execution of any 'security' related services. As with the 'uncontrolled' state, conventional MSC-enabled systems provide for reset of the MSC state only upon execution of a main program. However, the inter-process integrity serialization services prevent reset of the process controlled state for the life of the process(es). By preventing this reset, the process will, for the lifetime of that process, remain controlled.

Figure 2:
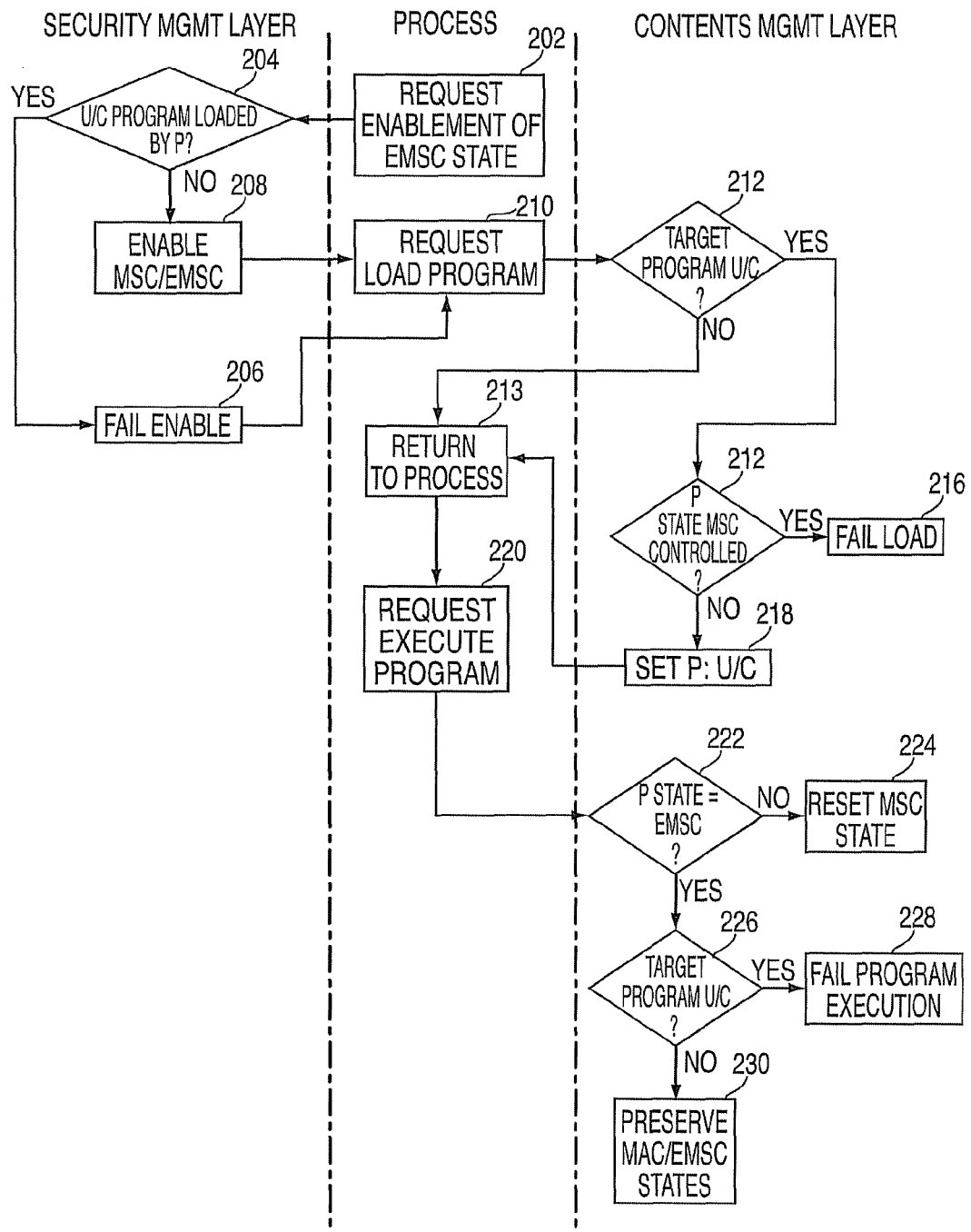
FIG. 2 is a flow diagram describing a process for setting a persistent controlled state via the inter-process integrity serialization services in exemplary embodiments.

As indicated above, the inter-process integrity serialization services enable a process to explicitly set an EMSC state that prevents loads from any unauthorized library. The EMSC state is a permanent controlled state that persists across execution of main programs, and for the life of the processes, as will now be described with respect to FIG. 2. As shown in the flow diagram of FIG. 2, the inter-process integrity serialization services are performed via the security management layer 112 in conjunction with the invoking process (e.g., process A) and the contents management layer 110.

The inter-process integrity serialization provides a service that is created and which allows for the explicit setting of the EMSC state (via attribute 122). No special authorization is required for this service since its main purpose is to place additional file access restrictions on the invoking process (e.g., process A). At step 202, the invoking process (e.g., process A 114) requests enablement of the EMSC state. Once called, the security management layer 112 checks to see if the invoking process has previously loaded or executed a program from a non-controlled library (e.g., database 104) at step 204. If so, the service will fail (i.e., EMSC enablement request denied), notifying the invoker (e.g., process A) that the process is already uncontrolled. In this instance, the process execution proceeds to step 210.

If, however, the invoking process has not yet loaded or executed a program from a non-controlled library at step 204, the invoking process is flagged with both MSC and EMSC via attributes 118 and 122, respectively at step 208. The MSC setting 118 maintains its historical function (e.g., per conventional MSC-enabled systems) and the EMSC setting 122 adds the new functionality of preventing the execution of non-controlled main programs from being executed as described herein. In addition to the added restriction of main program execution, the EMSC state will cause both the EMSC and the MSC states 118, 122 to be propagated across main program execution. As indicated above, in conventional systems the execution of a main program resets the process controlled state. The inter-process integrity serialization services prevent reset of the process controlled state. By preventing this reset, the process will, for the lifetime of that process, remain controlled.

At step 210, the process (e.g., process A 114) requests a program (e.g., application C 120) to be loaded. The contents management layer 110 determines whether the target program (i.e., the program to be loaded) is set as uncontrolled via, e.g., control indicator 108 at step 212. If so, the contents management layer 110 determines whether the process state is set as MSC=ON (via attribute 118) at step 214. If not, the request to load the program fails at step 216 and the process proceeds in a conventional manner. Otherwise, the process is flagged as uncontrolled (via attribute 116) at step 218 and control is returned to the process at step 213.

Returning to step 212, if the contents management layer 110 determines that the target program is not uncontrolled (e.g., from database 102), the program is loaded into temporary storage at step 213, whereby the process may then act upon the program as needed without going through contents management layer 110. At step 220, the process requests execution of a main program (e.g., via an execute system service that loads and executes a main program and clearing all storage in the process). The contents management layer 110 determines if the process state is set as EMSC at step 222 via attribute 122. If not, the MSC state is reset at step 224 (i.e., MSC attribute 118 is set to OFF) and the execution request is authorized. Otherwise, the contents management layer 110 determines if the target program is uncontrolled (e.g., from database 104) at step 226. If so, the request to execute the program fails at step 228. Otherwise, the MSC and EMSC states (via attributes 118, 122) are preserved by the contents management layer 110 at step 230 for the remainder of the process.

Figure 3:
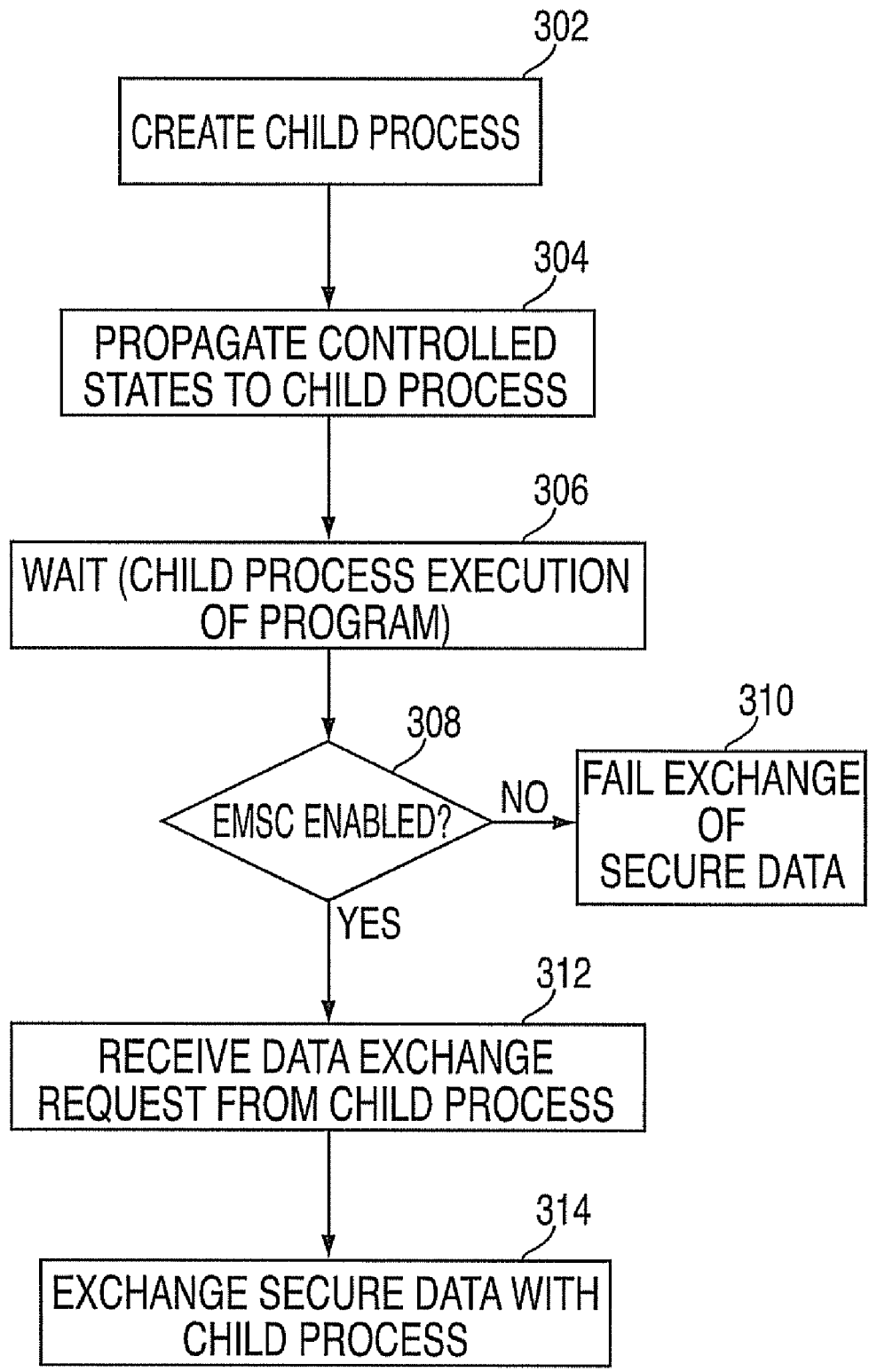
FIG. 3 is a flow diagram illustrating a process for enabling the exchange of sensitive or protected information between two processes via the inter-process integrity serialization services in exemplary embodiments.

As indicated above, once the EMSC state is set via attribute 122, the invoking process may then create a child process, whereby the EMSC state is propagated to that child. Turning now to FIG. 3, a process for enabling the exchange of sensitive information between two processes (e.g., parent and child processes) via the EMSC state setting 122 and the inter-process integrity serialization services will now be described in accordance with exemplary embodiments.

As indicated above, the EMSC state may be used to secure a multi-process application. The initial process (e.g., process A 114) explicitly enables the MSC state (via attribute 118), which also sets the additional EMSC indicator (via attribute 122). The initial process creates a child process at step 302. The EMSC and the MSC states (via attributes 118, 122) are propagated to the child process that the initial process (parent process) creates at step 304.

The child process executes the main program code (e.g., application C 120) as directed by the parent process, while the parent process waits at step 306. A method is provided by the inter-process integrity serialization services for a process (e.g., child process) to query its EMSC state to determine if it has inherited the EMSC state from its parent. At step 308, the child queries its state. If the child's queried state is not EMSC, then the data exchange with the parent is failed at step 310. If the child's queried state is indicated to be EMSC, the child process initiates a data exchange with the parent. At step 312, the parent process receives the request for data exchange. Since the parent explicitly set the EMSC and the MSC states prior to creation of the child, the parent is guaranteed that the child's state was inherited from the parent and therefore it is known that the child's state is also EMSC and MSC. At this point the two processes may exchange secure data between each other at step 314.

As indicated above, the EMSC and the MSC states persist across the execution of controlled main programs. Any programs loaded from non-controlled libraries (e.g., database 104) are not allowed to run via the processes, and any attempt to do so causes a failure on execution and terminates the child process. Since the inter-process integrity serialization services provide no method by which a process may disable the EMSC state, the parent process can be assured that its child process is controlled for the entire life of that child process.

Further, if a child process performs the state query, and it is acknowledged that it is currently running EMSC=ON, and if the child itself had not explicitly set the EMSC state, the child can be assured that it inherited the EMSC state from its parent and can therefore trust its parent to be controlled. With the trust level established between both processes, it is safe to exchange secure data.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing inter-process integrity serialization services, comprising:
   enabling process states including a must-stay-controlled (MSC) state and an extended must-stay-controlled (EMSC) state for an invoking process when it is determined that only programs designated as controlled, if any, have been loaded for the invoking process, the invoking process requesting loading of a target program into temporary storage for performing a security service;
   creating a child process thread, the child process thread a child of the invoking process;
   propagating the MSC and EMSC state of the target program to the child process thread;
   executing the target program by the child process thread under instruction from the invoking process;
   determining if the child process thread has inherited the EMSC state of the invoking thread;
   securely exchanging information between the invoking thread and the child process thread based on the MSC and EMSC states, in response to determining that the child process thread has inherited the EMSC state of the invoking thread; and
   based upon a control indicator of the target program, the MSC state, and the EMSC state, controlling one or more activities within the temporary storage, comprising:
      the loading of the target program into the temporary storage, the temporary storage accessible to the invoking process;
      execution of a main program in the temporary storage; and
      reset of the MSC state and the EMSC state across execution of the main program during the lifetime of the invoking process;
   wherein programs are designated as controlled upon validation under security guidelines.

2. The method of claim 1, wherein the main program clears the temporary storage of the invoking process before control is passed to another program.

3. The method of claim 1, wherein the target program is loaded into the temporary storage when the control indicator reflects that the target program is controlled and the MSC state for the invoking process is enabled.

4. The method of claim 1, further comprising:
   setting a process control attribute of the invoking process to reflect uncontrolled when the control indicator of the target program reflects that the target program is uncontrolled and when the MSC state is disabled; and
   loading the target program into the temporary storage;
   wherein programs are designated as uncontrolled if not validated under security guidelines or a failure responsive to validation under the security guidelines.

5. The method of claim 1, further comprising:
   upon receiving a request to execute the main program:
      resetting the MSC state for the invoking process when it is determined that the EMSC state is disabled; and
      authorizing execution of the main program.

6. The method of claim 1, further comprising:
upon receiving a request to execute the main program:
denying the request to execute the main program when it is determined that the EMSC state is enabled and the control attribute of the target program reflects that the target program is uncontrolled.

7. The method of claim 1, further comprising:
upon receiving a request to execute the main program:
preserving the MSC state and the EMSC state of the invoking process when it is determined that the EMSC state is enabled and the control attribute of the target program reflects that the target program is controlled.

8. A system for implementing inter-process integrity serialization services, comprising:
a computer processing system; and
an inter-process integrity serialization service executing on the computer processing system, the inter-process integrity serialization service implementing a method, comprising:
enabling process states including a must-stay-controlled (MSC) state and an extended must-stay-controlled (EMSC) state for an invoking process when it is determined that only programs designated as controlled, if any, have been loaded for the invoking process, the invoking process requesting loading of a target program into temporary storage of the computer processing system for performing a security service;
creating a child process thread, the child process thread a child of the invoking process;
propagating the MSC and EMSC state of the target program to the child process thread;
executing the target program by the child process thread under instruction from the invoking process;
determining if the child process thread has inherited the EMSC state of the invoking thread;
securely exchanging information between the invoking thread and the child process thread based on the MSC and EMSC states, in response to determining that the child process thread has inherited the EMSC state of the invoking thread; and
based upon a control indicator of the target program, the MSC state, and the EMSC state, controlling one or more activities within the temporary storage, comprising:
the loading of the target program into the temporary storage, the temporary storage accessible to the invoking process;
execution of a main program in the temporary storage; and
reset of the MSC state and the EMSC state across execution of the main program during the lifetime of the invoking process;
wherein programs are designated as controlled upon validation under security guidelines.

9. The system of claim 8, wherein the main program clears the temporary storage of the invoking process before control is passed to another program.

10. The system of claim 8, wherein the target program is loaded into the temporary storage when the control indicator reflects that the target program is controlled and the MSC state for the invoking process is enabled.

11. The system of claim 8, wherein the inter-process integrity serialization service further performs:
setting a process control attribute of the invoking process to reflect uncontrolled when the control indicator of the target program reflects that the target program is uncontrolled and when the MSC state is disabled; and
loading the target program into the temporary storage;
wherein programs are designated as uncontrolled if not validated under security guidelines or a failure responsive to validation under the security guidelines.

12. The system of claim 8, wherein the inter-process integrity serialization service further performs:
upon receiving a request to execute the main program:
resetting the MSC state for the invoking process when it is determined that the EMSC state is disabled; and
authorizing execution of the main program.

13. The system of claim 8, wherein the inter-process integrity serialization service further performs:
upon receiving a request to execute the main program:
denying the request to execute the main program when it is determined that the EMSC state is enabled and the control attribute of the target program reflects that the target program is uncontrolled; and
upon receiving a request to execute the main program:
preserving the MSC state and the EMSC state of the invoking process when it is determined that the EMSC state is enabled and the control attribute of the target program reflects that the target program is controlled.

14. A computer program product comprising a non-transitory storage medium storing instructions, which when executed implement inter-process integrity serialization services, the computer program product implementing a method, comprising:
enabling process states including a must-stay-controlled (MSC) state and an extended must-stay-controlled (EMSC) state for an invoking process when it is determined that only programs designated as controlled, if any, have been loaded for the invoking process, the invoking process requesting loading of a target program into temporary storage for performing a security service;
creating a child process thread, the child process thread a child of the invoking process;
propagating the MSC and EMSC state of the target program to the child process thread;
executing the target program by the child process thread under instruction from the invoking process;
determining if the child process thread has inherited the EMSC state of the invoking thread;
securely exchanging information between the invoking thread and the child process thread based on the MSC and EMSC states, in response to determining that the child process thread has inherited the EMSC state of the invoking thread; and
based upon a control indicator of the target program, the MSC state, and the EMSC state, controlling one or more activities within the temporary storage, comprising:
the loading of the target program into the temporary storage, the temporary storage accessible to the invoking process;
execution of a main program in the temporary storage; and
reset of the MSC state and the EMSC state across execution of the main program during the lifetime of the invoking process;
wherein programs are designated as controlled upon validation under security guidelines.

15. The computer program product of claim 14, wherein the main program clears the temporary storage of the invoking process before control is passed to another program.

16. The computer program product of claim 14, wherein the target program is loaded into the temporary storage when the control indicator reflects that the target program is controlled and the MSC state for the invoking process is enabled.

17. The computer program product of claim 14, further comprising instructions for implementing:
setting a process control attribute of the invoking process to reflect uncontrolled when the control indicator of the target program reflects that the target program is uncontrolled and when the MSC state is disabled; and
loading the target program into the temporary storage;
wherein programs are designated as uncontrolled if not validated under security guidelines or a failure responsive to validation under the security guidelines.

18. The computer program product of claim 14, further comprising instructions for implementing:
upon receiving a request to execute the main program:
resetting the MSC state for the invoking process when it is determined that the EMSC state is disabled; and
authorizing execution of the main program.

19. The computer program product of claim 14, further comprising instructions for implementing:
upon receiving a request to execute the main program:
denying the request to execute the main program when it is determined that the EMSC state is enabled and the control attribute of the target program reflects that the target program is uncontrolled.

20. The computer program product of claim 14, further comprising instructions for implementing:
upon receiving a request to execute the main program:
preserving the MSC state and the EMSC state of the invoking process when it is determined that the EMSC state is enabled and the control attribute of the target program reflects that the target program is controlled.

* * * * *